Nov. 25, 1930.  A. SCHREMPP  1,783,143
FILTER DEVICE
Filed Jan. 4, 1927  2 Sheets-Sheet 1

Inventor:
Albert Schrempp
by Langner, Parry, Card & Langner
Att'ys.

Nov. 25, 1930.  A. SCHREMPP  1,783,143
FILTER DEVICE
Filed Jan. 4, 1927   2 Sheets-Sheet 2

Inventor:
A. Schrempp

Patented Nov. 25, 1930

1,783,143

UNITED STATES PATENT OFFICE

ALBERT SCHREMPP, OF DUSSELDORF, GERMANY

FILTER DEVICE

Application filed January 4, 1927, Serial No. 158,963, and in Germany January 9, 1926.

The invention relates to improvements in filter devices, such as are used for purifying air, fluids, vapors and the like.

According to the invention the usual filters are replaced by plates of sheet metal or the like, in which perforations are punched out in such a manner, that the metal displaced by the punching operation will form slotted or rented coronas at the edge of the individual perforation similar to the upstanding "warts" on kitchen-raspers. The perforations are preferably uniformly distributed over the plate and may be of round, edged, oblong, rectangular or of any other convenient cross section. The height of the coronas or projecting flange should preferably be substantially the same over the entire plate. In a filter the plates are arranged in such a manner, that perforations and consequently also the coronas of adjacent plates are positioned in staggered relation to each other.

Some preferred forms of the inventions are shown by way of examples in the accompanying drawings, in which Fig. 1 is a vertical section through a part of a filter member, embodying the invention.

Figure 1:
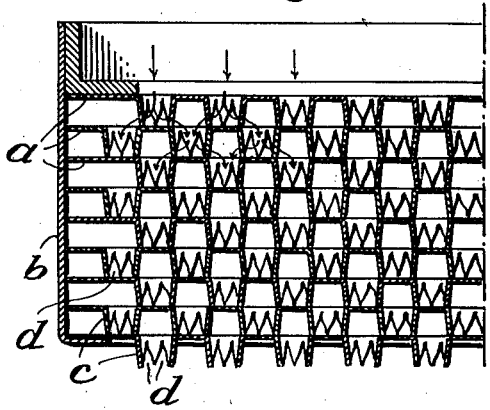
Figure 2:
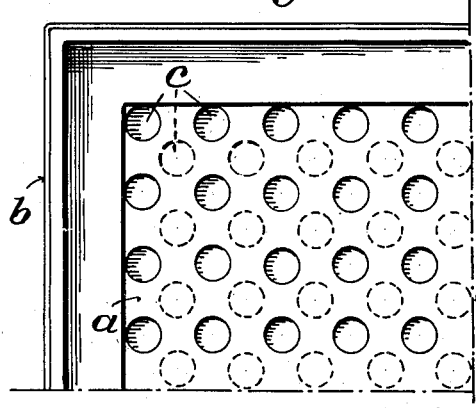
Fig. 2 is a top view of the same filter member.

Each filter member consists of a suitable number of superimposed filter elements or plates $a$ which are surrounded by a frame $b$. The single members may be connected to form filters of any desired size.

The essential feature of the invention is to equip the filter elements $a$ with flanges $c$, which project upward or downward and which are arranged in such a manner, that the rims or edges of the projections or flanges on each element abut against the neighbouring elements above or below between the perforations of the same. The perforations of the filter elements and the coronas or flanges at the edges of the same are thereby arranged in staggered relation to each other in the length direction as well as in the depth. The flanges which are formed when the perforations are punched out will have edges of somewhat irregular shape consisting of tooth-shaped projecting parts with open spaces $d$ between them. These open spaces or slots $d$ form lateral passages to the adjacent openings of the neighbouring elements.

The cross sections of the tubular flanges $c$ as well as of the lateral openings in the same may be round, edged, jagged as shown in the drawings or of any other form. Also slots and apertures in combination may be used.

The new filters, which are of a surprisingly high efficiency are not only employable as air and gas filters, but also as water or oil separators and for the filtering of vapors, to name a few of the purposes for which the invention is suited. The filter elements may be formed from any suitable material, also from aluminium or alloys.

The simplest manner of producing the flanges or coronas is of course to punch the same in the filter elements. The flanges may however also be produced in any other manner and may also be produced separately and inserted into suitable apertures in the filter elements. These apertures may in such case even be formed with short sleeves, serving as seats for removable tubular flanges.

If the filter elements are used for separating water or oil from gases or vapors, the members are used in dry state. Suitably the sheet shaped elements are provided with grooves or the like in order to facilitate the downflow of the deposited fluid.

The sheet shaped elements may also be employed as sound dampers, for instance in automobil-motors, air craft motors and the like. If the sound damper is correctly dimensioned the exhaust resistance is very low and the damping is substantially free from resistance.

The new filter elements or corona sheets are in polygonal or round form employable as cylindrical filter members, which are simple to manufacture and which easily can be assembled in suitable casings.

Figure 3:
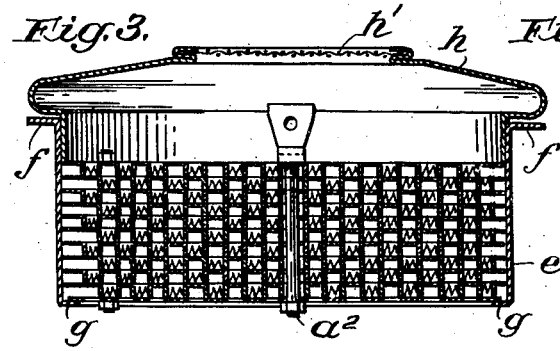
Fig. 3 is an axial sectional view, showing a frame structure with filter elements.

Such filter member is shown in Fig. 3. The member consists of a cylindrical casing $e$ of sheet metal having an outwardly directed top flange $f$ and an inwardly bent bottom flange or ring $g$ adapted to support the inserted filter elements. The width of the flange $g$ is only sufficient to offer a secure rest for the filter elements $a$, as shown in Fig. 3. The open space formed by the flange $g$ forms an unobstructed passage for the air gases or vapors.

The filter elements are superimposed and are equipped with perforations, which in each sheet are lying in staggered relation to the perforations in the adjacent sheets. A number of elements are kept together by means of a threaded bolt $a^2$. A cover $h$, the rim of which is inwardly bent, so as to fit tightly in the casing $e$, is equipped with a wire net or screen $h^1$. The inwardly bent rim serves for fixing the inserted filter elements in their places.

On account of their circular form the filter sheets fit snugly in the casing and form a tortuous passage through which the gases or the air to be purified must pass.

Figure 4:
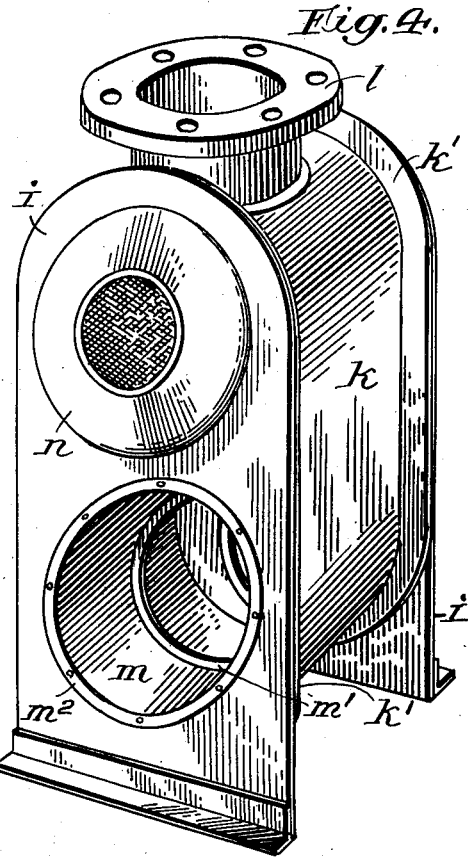
Fig. 4 is a view of a frame structure adapted to receive such elements.

Fig. 4 shows a frame structure adapted to take up several filter members. The structure may of course be of any shape or size. According to the figure the structure consists of a front and a rear wall $i$ in which a plurality of round apertures are stamped.

Both walls are connected by means of a mantle $k$ having flanged rims $k^1$. The mantle is also equipped with a coupling sleeve $l$, by means of which the apparatus may be connected to a gas conduit, to a suction- or pressure conduit, to a compressor or the like. In the openings in the plates $i$ a support cylinder $m$ is located, which consists of a cylindrical body having an outwardly bent flange $m^2$ and an inwardly bent bottom flange $m^1$. These cylinders are connected to the plates $i$ by means of rivets, screws or the like and form with the plates a frame adapted to hold the filter cells $n$.

The frame may be manufactured in any desired size and be equipped with filter elements in the front wall and the rear wall or on all sides. The individual cylinders are equipped with filter elements, the numbers and dimensions of which vary in accordance with the desired capacity or output. Support cylinders not in use may be closed by means of covers.

Figure 5:
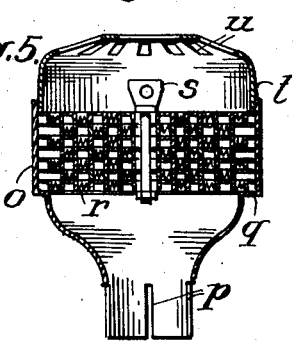
Fig. 5 is a sectional view of a filter device of a special form.
Figure 6:
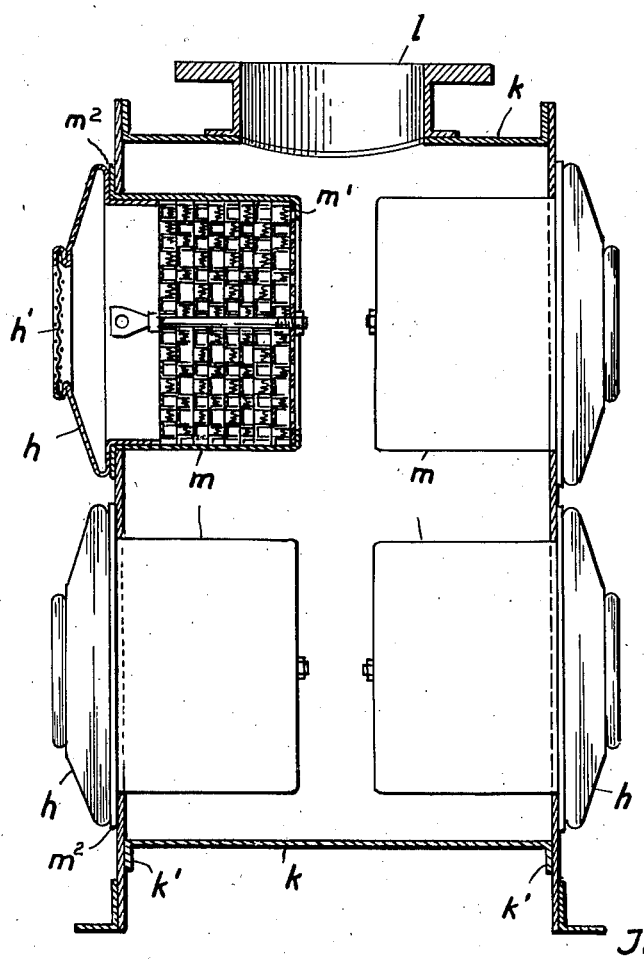
Fig. 6 is a vertical cross-sectional view of the structure shown in Fig. 4.

The substantially bottle-shaped filter of Fig. 5 consists of a casing $o$ of sheet metal (for instance aluminium) or any other material which suitably toward the sucking-off end is narrowed and provided with slots $p$. The casing is preferably pressed or otherwise formed. At $q$ the cylindrical capsule space is equipped with a flange serving as a support for the filter elements and a sieve plate $r$. The flanged, slotted or rent edges or rims of the perforations of the filter plates may be directed in the direction of or opposite the direction of the gas- or air current and the flanges or coronas of adjacent filter elements are placed in staggered relation to each other. A plurality of such elements are kept together by means of a common threaded bolt $s$. When the filtering device is opened the sheets can easily be removed. The device is closed by a cover $t$ which is equipped with apertures $u$ or a wire net through which the air is admitted.

I claim:

1. A filter device consisting of superimposed sheet-shaped filter elements, perforations with projecting rims formed in each element, slots formed in each projecting rim, the distance between adjacent filter sheets being substantially equal to the height of the projecting rims of the said filter elements and the perforations of each element being arranged in staggered relation to the perforations of the neighbouring elements.

2. A filter device, consisting of superimposed sheet-shaped filter elements, perforations with projecting rims formed on one side of each element and arranged in such a manner that the perforations of each element are lying in staggered relation to the perforations in the adjacent elements and assembling means for the said elements.

3. A filter member, comprising a plurality of superimposed filter elements, having perforations with projecting jagged rims, the elements being arranged in such a manner that the perforations of neighbouring filter elements are located in staggered relation to each other, a casing for the said filter elements, a cover closing said casing, and an opening in said cover.

4. A filter member, comprising a plurality of superimposed filter elements, having perforations with projecting jagged rims, the elements being arranged in such a manner that the perforations of neighbouring filter elements are located in staggered relation to each other, a casing for the said filter elements, with an outwardly bent flange and an inwardly bent bottom flange, a cover closing said casing, an opening in said cover and a wire net in said opening.

5. A filtering apparatus, comprising a plurality of sets of superimposed filter elements, said elements having perforations with projecting jagged rims, the elements of each set being arranged in such a manner that the perforations of neighbouring filter elements are located in staggered relation to each other, a casing for each set of filter elements, with an outwardly bent flange at one end and an inwardly bent flange at the other end, covers for the casings and a common frame structure for said casings.

In testimony whereof I affix my signature.

ALBERT SCHREMPP.